(12) United States Patent
Kim et al.

(10) Patent No.: US 8,808,436 B2
(45) Date of Patent: Aug. 19, 2014

(54) ABSORPTION CELL AND MANUFACTURING METHOD THEREOF

(75) Inventors: Jee Yong Kim, Seoul (KR); Rae Eun Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 209 days.

(21) Appl. No.: 13/317,934

(22) Filed: Nov. 1, 2011

(65) Prior Publication Data

US 2012/0145007 A1    Jun. 14, 2012

(30) Foreign Application Priority Data

Dec. 10, 2010 (KR) .................. 10-2010-0126523

(51) Int. Cl.
*B01D 53/02* (2006.01)

(52) U.S. Cl.
USPC ................. 96/152; 96/154; 216/56; 427/243; 502/400

(58) Field of Classification Search
USPC ........ 96/152, 154; 216/56; 427/243; 502/400
See application file for complete search history.

(56) References Cited

U.S. PATENT DOCUMENTS

| | | | | |
|---|---|---|---|---|
| 4,433,063 A * | 2/1984 | Bernstein et al. | ............. | 502/402 |
| 5,443,616 A * | 8/1995 | Congdon | ......................... | 75/240 |
| 6,368,383 B1 * | 4/2002 | Virkar et al. | ...................... | 95/54 |
| 6,689,714 B2 * | 2/2004 | Wheelock et al. | ............ | 502/400 |
| 7,370,657 B2 * | 5/2008 | Zhuang et al. | ................. | 131/331 |
| 7,501,012 B2 * | 3/2009 | Tatarchuk et al. | .............. | 96/132 |
| 7,628,842 B2 * | 12/2009 | Schwartz et al. | .................. | 95/56 |
| 7,998,898 B2 * | 8/2011 | Gadkarec et al. | ............. | 502/417 |
| 8,501,142 B2 * | 8/2013 | Tennison et al. | .......... | 423/445 R |
| 2003/0153457 A1 | 8/2003 | Nemoto et al. | | |
| 2005/0112056 A1 * | 5/2005 | Hampden-Smith et al. | .. | 423/651 |
| 2005/0202969 A1 * | 9/2005 | Kondo et al. | ................. | 502/416 |
| 2006/0042462 A1 * | 3/2006 | Ezell et al. | ......................... | 95/47 |
| 2009/0000475 A1 * | 1/2009 | Fekety et al. | .................. | 95/105 |
| 2009/0111690 A1 * | 4/2009 | Gadkarec et al. | ............. | 502/417 |
| 2010/0212071 A1 | 8/2010 | Böhringer et al. | | |
| 2010/0213131 A1 | 8/2010 | Linford et al. | | |
| 2010/0239479 A1 * | 9/2010 | Gadkaree et al. | .......... | 423/215.5 |
| 2010/0251888 A1 * | 10/2010 | Fekety et al. | ...................... | 95/54 |
| 2011/0048063 A1 * | 3/2011 | Carruthers et al. | ............. | 62/476 |
| 2011/0180298 A1 * | 7/2011 | Kato et al. | ................ | 174/102 R |
| 2011/0247493 A1 * | 10/2011 | Hatscher | .......................... | 95/90 |

FOREIGN PATENT DOCUMENTS

| | | |
|---|---|---|
| KR | 10-2010-0005527 | 1/2010 |
| WO | 96/38232 | 12/1996 |

OTHER PUBLICATIONS

Extended European Search Report dated Mar. 26, 2012 issued in corresponding European Patent Application No. 11188918.4.
U.S. Office Action issued Oct. 24, 2013 in copending U.S. Appl. No. 14/026,670.

(Continued)

*Primary Examiner* — Christopher P Jones
(74) *Attorney, Agent, or Firm* — Staas & Halsey LLP

(57) ABSTRACT

An absorption cell includes a first absorption layer formed of a first absorbent, and a second absorption layer formed of a second absorbent having a higher density than the first absorbent and coated on the surface of the first absorption layer so as to prevent generation of dust particles from the first absorption layer. The upper surface of the first absorption layer is coated with the second absorption layer formed of the high-density absorbent, thereby preventing generation of minute dust particles and thus preventing secondary contamination.

9 Claims, 13 Drawing Sheets

(56) References Cited

OTHER PUBLICATIONS

U.S. Appl. No. 14/026,670, filed Sep. 13, 2013, Jee Yong Kim, Samsung Electronics Co., Ltd.

U.S. Notice of Allowance issued Feb. 26, 2014 in copending U.S. Appl. No. 14/026,670.

* cited by examiner

ABSORPTION CELL AND MANUFACTURING METHOD THEREOF

CROSS-REFERENCE TO RELATED APPLICATIONS

This application claims the benefit of Korean Patent Application No. 2010-0126523, filed on Dec. 10, 2010 in the Korean Intellectual Property Office, the disclosure of which is incorporated herein by reference.

BACKGROUND

1. Field

Embodiments of the present disclosure relate to an absorption cell which achieves absorption and decomposition of substances and a manufacturing method thereof.

2. Description of the Related Art

Recently, kinds of air pollutants are diversified due to economic development and industrialization. Particularly, odorous gases (hydrogen sulfide ($H_2S$), ammonia ($NH_3$), amines ($RNH_2$) and Volatile Organic Compounds (VOCs)) generated from living spaces and industrial facilities cause headaches and displeasure when inhaled, and thus research into reduction or removal of such harmful substances is underway.

As technology to remove such odorous gases, chemical absorbents which physically absorb odor generating substances and chemically decompose or bond the substances so as to be stably fixed to the surfaces of the absorbents have been widely used.

These chemical absorbents are manufactured in consideration of 1) removal rate of harmful substances 2) removal capacity of harmful substances 3) whether or not minute particles are generated 4) fluid diffusion property, so as to decide performance and quality.

Chemical absorbents are divided into low-density chemical absorbents and high-density chemical absorbents according to amounts of the absorbents contained in the same volume.

The low-density chemical absorbents have low binding force and thus may generate dust particles. Further, the high-density chemical absorbents have a low diffusion rate of air between absorbent molecules and thus have low odor generating substance removal rate.

SUMMARY

Therefore, it is an aspect of the present disclosure to provide an absorption cell in which the surface of a first absorption layer formed of an absorbent is coated with a second absorption layer formed of a high-density absorbent so as to prevent generation of dust particles from the first absorption layer, and a manufacturing method thereof.

Additional aspects of the disclosure will be set forth in part in the description which follows and, in part, will be apparent from the description, or may be learned by practice of the disclosure.

In accordance with one aspect of the present disclosure, an absorption cell includes a first absorption layer formed of a first absorbent, and a second absorption layer formed of a second absorbent having a higher density than the first absorbent and coated on the surface of the first absorption layer so as to prevent generation of dust particles from the first absorption layer.

The second absorption layer may include a plurality of pore parts through which a fluid flows to the first absorption layer.

The second absorption layer may further include a plurality of protrusion parts protruded from the first absorption layer.

The first absorption layer may be formed in a spherical shape.

The absorption cell may further include a third absorption layer located within the first absorption layer and formed of the second absorbent.

The first absorption layer may be formed in a spherical shape.

The second absorption layer may include a plurality of pore parts through which a fluid flows to the first absorption layer.

The second absorption layer may further include a plurality of protrusion parts protruded from the first absorption layer.

In accordance with another aspect of the present disclosure, an absorption cell includes a first absorption layer formed of a mixture of a first absorbent and a second absorbent having a higher density than the first absorbent, and a second absorption layer formed of the second absorbent having a higher density than the first absorbent and surrounding the surface of the second absorption layer so as to prevent generation of dust particles from the first absorption layer.

The second absorption layer may include a plurality of pore parts through which a fluid flows to the first absorption layer.

The second absorption layer may further include a plurality of protrusion parts protruded from the first absorption layer.

The first absorption layer may be formed in a spherical shape.

In accordance with another aspect of the present disclosure, a manufacturing method of an absorption cell includes preparing a first absorption layer formed of a first absorbent, coating the surface of the first absorption layer with a protective layer formed of a low-carbonizing point material and a second absorbent having a higher density than the first absorbent so as to prevent generation of dust particles from the first absorption layer, and removing the low-carbonizing point material from the protective layer so as to form a second absorption layer including a plurality of pore parts through which a fluid flows to the first absorption layer.

The low-carbonizing point material may be removed through heat treatment or acid treatment.

The coating of the surface of the first absorption layer with the protective layer and the removal of the low-carbonizing point material may be repeated so as to form the second absorption layer to a designated thickness on the surface of the first absorption layer.

The first absorption layer may be formed in a spherical shape.

The manufacturing method may further include preparing a third absorption layer formed of the second absorbent within the first absorption layer.

The first absorption layer may be formed in a spherical shape.

The coating of the surface of the first absorption layer with the protective layer and the removal of the low-carbonizing point material may be repeated so as to form the second absorption layer to a designated thickness on the surface of the first absorption layer.

In accordance with a further aspect of the present disclosure, a manufacturing method of an absorption cell includes preparing a first absorption layer formed of a mixture of a first absorbent and a second absorbent having a higher density than the first absorbent, coating the surface of the first absorption layer with a protective layer formed of a low-carbonizing point material and the second absorbent so as to prevent generation of dust particles from the first absorption layer, and removing the low-carbonizing point material from the protective layer so as to form a second absorption layer including a plurality of pore parts through which a fluid flows to the first absorption layer.

The low-carbonizing point material may be removed through heat treatment or acid treatment.

The coating of the surface of the first absorption layer with the protective layer and the removal of the low-carbonizing point material may be repeated so as to form the second absorption layer to a designated thickness on the surface of the first absorption layer.

The first absorption layer may be formed in a spherical shape.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
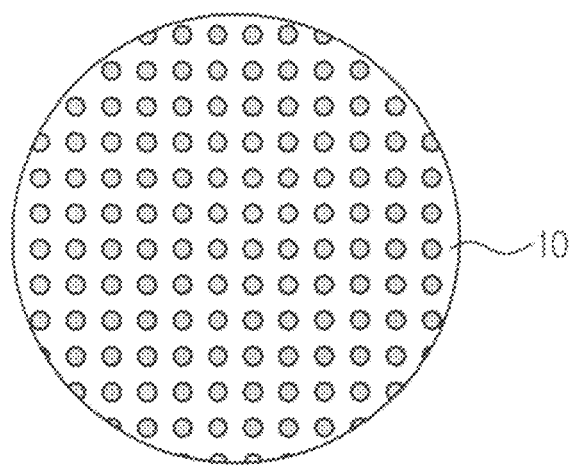
FIG. 1A is a view illustrating one example of an absorption layer formed of a low-density chemical absorbent.

Reference will now be made in detail to the embodiments of the present disclosure, examples of which are illustrated in the accompanying drawings, wherein like reference numerals refer to like elements throughout.

Figure 1B:
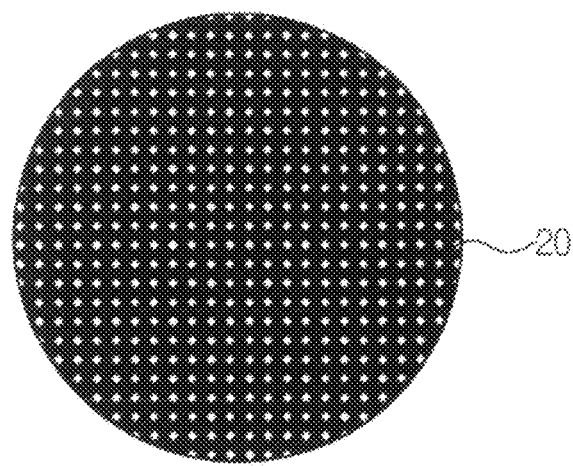
FIG. 1B is a view illustrating one example of an absorption layer formed of a high-density chemical absorbent.

FIG. 1A is a view illustrating one example of an absorption layer formed of a low-density chemical absorbent and FIG. 1B is a view illustrating one example of an absorption layer formed of a high-density chemical absorbent.

A chemical absorbent is a material having high chemical activity obtained by impregnating an absorbent having a high specific surface area, such as activated carbon or alumina, with a metal, a metal salt or an organic compound, and is used to selectively absorb and remove gas to be removed through neutralization or chemical reaction.

That is, the chemical absorbent perform physical absorption of odor or VOCs (hereinafter, odor generating substances) floating in air and chemical absorption of these substances to chemically decompose or bond the substances, thus removing the odor generating substances.

Such a chemical absorbent is compressed by a designated pressure, thus forming an absorption layer. According to the intensity of the designated pressure, absorption layers are divided into an absorption layer 10 formed of a low-density chemical absorbent (hereinafter, referred to as a low-density absorption layer) shown in FIG. 1A and an absorption layer 20 formed of a high-density chemical absorbent (hereinafter, referred to as a high-density absorption layer) shown in FIG. 1B.

With reference to FIG. 1A, the low-density absorption layer 10 has a wide interval between absorbent molecules, and thus a fluid rapidly flows into the low-density absorption layer 10.

That is, since air is rapidly diffused into gaps between the absorbent molecules, chemical reaction between the absorbent molecules and odor generating substances in air easily occurs, and thus the odor generating substances are rapidly removed.

However, the low-density absorption layer 10 has a wide interval between the absorbent molecules and weak binding force between the absorbent molecules, and thus dust particles may be generated.

With reference to FIG. 1B, the high-density absorption layer 20 has a narrow interval between absorbent molecules, differently from the low-density absorption layer 10, and thus air is slowly diffused into gaps between the absorbent molecules and odor generating substance removal rate is low.

Further, the high-density absorption layer 20 has a larger amount of the absorbent contained in the same volume than the low-density absorption layer 10, thus having high removal capacity.

The high removal capacity causes increase of the life span of the absorption layer. The high-density absorption layer 20 has a low air diffusion property and thus has a short life span compared to the removal capacity thereof.

Hereinafter, with reference to FIG. 2, problems of the low-density absorption layer 10 will be described in detail.

Figure 2:
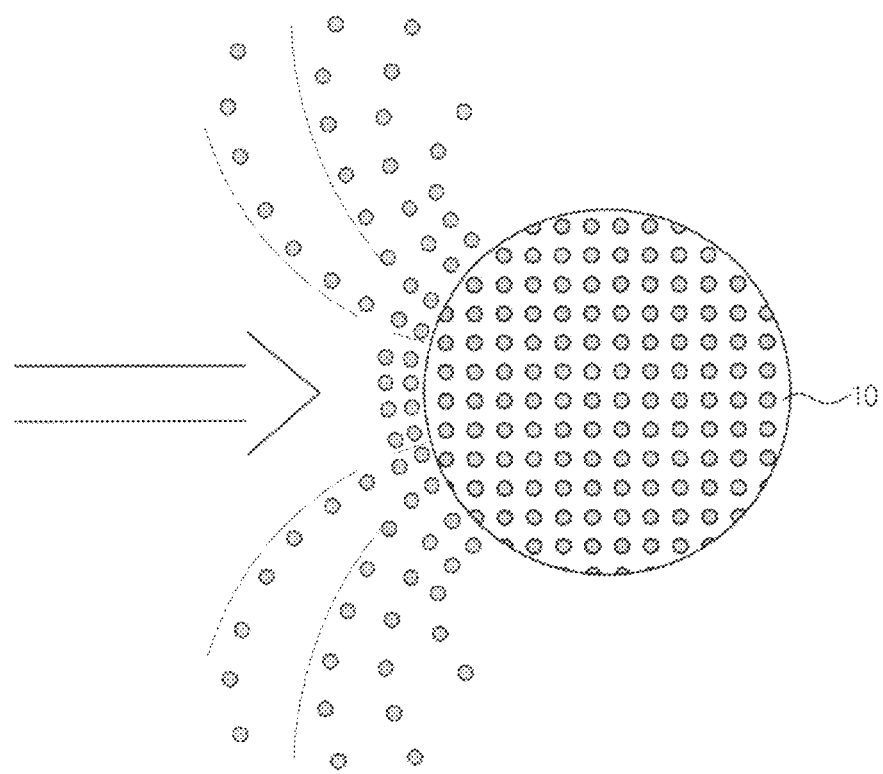
FIG. 2 is a view illustrating dust particles generated from the absorption layer formed of a low-density chemical absorbent.

FIG. 2 is a view illustrating dust particles generated from the absorption layer having a low-density chemical absorbent.

First, it is assumed that air 1 containing odor generating substances is introduced into the low-density absorption layer 10 in a designated direction.

With reference to FIG. 2, while the air 1 is introduced into the absorption layer 10, the air 1 applies flow pressure to the absorption layer 10.

Thereby, physical impact is applied to the absorption layer 10 in the introducing direction of the air 1, and dust particles are generated from the absorption layer 10 due to the physical impact.

The dust particles may cause fatal defects in a semiconductor manufacturing process, and further cause secondary contamination of an air conditioning system using the absorbent.

Therefore, the absorption layer needs to be formed of a low-density absorbent having excellent odor generating substance removal efficiency and generation of the dust particles from the low-density absorption layer needs to be eliminated.

Thereafter, in order to solve the problems of the low-density absorption layer, an absorption cell and a manufacturing method thereof in accordance with various embodiments of the present disclosure will be described.

Figure 3:
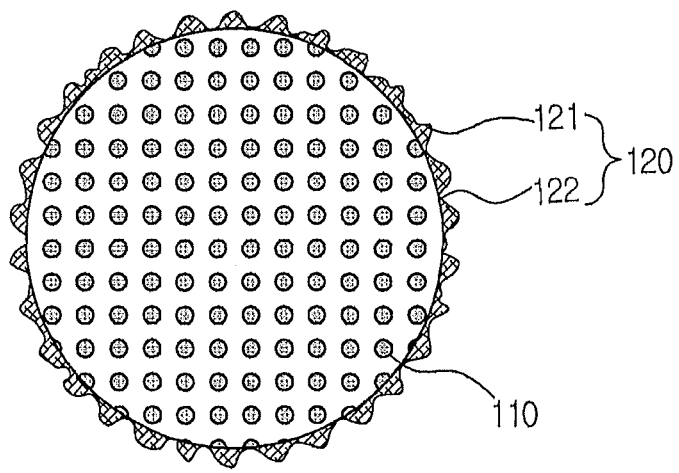
FIG. 3 is a view illustrating an absorption cell in accordance with one embodiment of the present disclosure.
Figure 4:
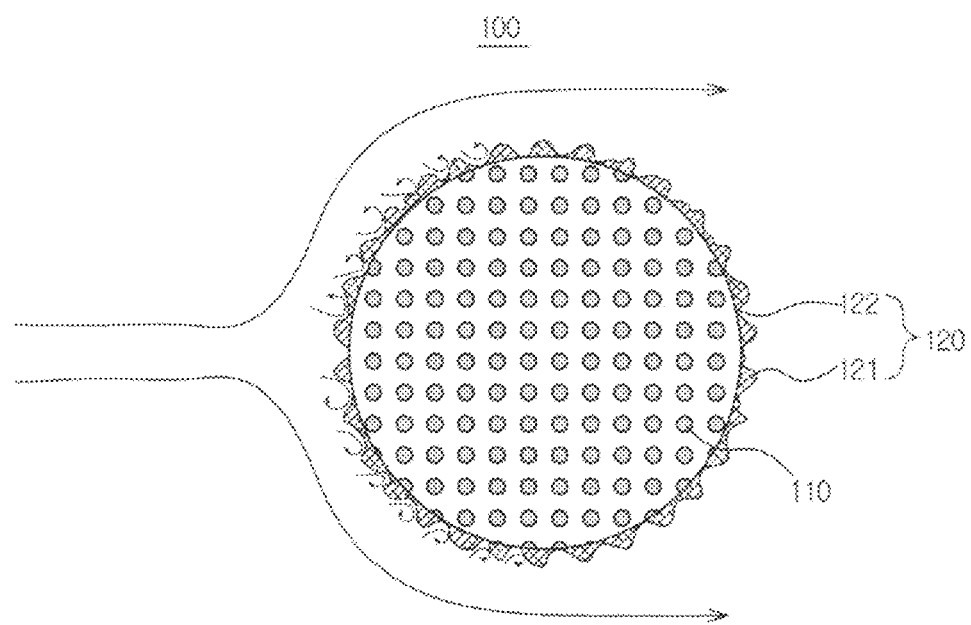
FIG. 4 is a view illustrating flow of a fluid around the absorption cell of FIG. 3.

FIG. 3 is a view illustrating an absorption cell in accordance with one embodiment of the present disclosure and FIG. 4 is a view illustrating flow of a fluid around the absorption cell of FIG. 3.

With reference to FIG. 3, an absorption cell 100 in accordance with this embodiment includes a first absorption layer 110 and a second absorption layer 120.

The first absorption layer 110 is designed in a spherical shape so as to form an inner core of the absorption cell 100. The first absorption layer 110 may be formed in other shapes than the spherical shape.

The first absorption layer 110 is formed of a low-density absorbent impregnated with $KMnO_4$, $NaMnO_4$, $H_3PO_4$, or $RNH_2$.

Such a first absorption layer 110 has weak binding force between absorbent molecules, as described above, and thus may generate dust particles due to flow pressure of air.

Therefore, in accordance with this embodiment, in order to prevent generation of minute dust particles form the first absorption layer 110, the second absorption layer 120 is provided on the surface of the first absorption layer 110.

Preferably, the second absorption layer 120 may have various thicknesses from several tens of nm to several hundred μm.

The second absorption layer 120 is formed of a high-density absorbent having high binding force between absorbent molecules. In this embodiment, the second absorption layer 120 is formed on the upper surface of the first absorption layer 110 so as to serve as a protective layer against physical impact.

Therefore, the second absorption layer 120 may prevent generation of dust particles from the first absorption layer 110.

The second absorption layer 120 includes a plurality of pore parts 122 to perform substance transfer to the first absorption layer 110. The pore parts 122 of the second absorption layer 120 serve as channels through which a fluid flows to the first absorption layer 110, thereby allowing air including odor generating substances to flow to the first absorption layer 110.

Therefore, although the second absorption layer 120 having relatively low removal rate surrounds the surface of the first absorption layer 110, air may flow to the first absorption layer 110 having high removal rate and thus the absorption cell 100 may maintain high odor generating substance removal rate.

FIG. 4 illustrates flow of a fluid to the absorption cell including the first absorption layer and the second absorption layer.

With reference to FIG. 4, the second absorption layer 120 formed of the high-density absorbent prevents the first absorption layer 10 from being directly exposed to the external air 1, thus serving as a protective layer.

Further, the second absorption layer 120 including irregular protrusion parts 121 increases the surface area of the absorption cell 100 contacting the air 1.

Further, it is understood that air flows in a whirlpool shape within the pore parts 122. Thereby, time for which the air 1 contacts the first absorption layer 110 and the second absorption layer 120 increases.

Therefore, in the absorption cell 100 in accordance with this embodiment, the first absorption layer 110 is coated with the second absorption layer 120 including the plural pore parts 122, and thus prevents generation of minute dust particles from the first absorption layer 110 and increases the surface area of the absorption cell 100 in contact with the air 1 and contact time between the air 1 and the absorption cell 100, thereby increasing odor generating substance removal efficiency.

Figure 5:
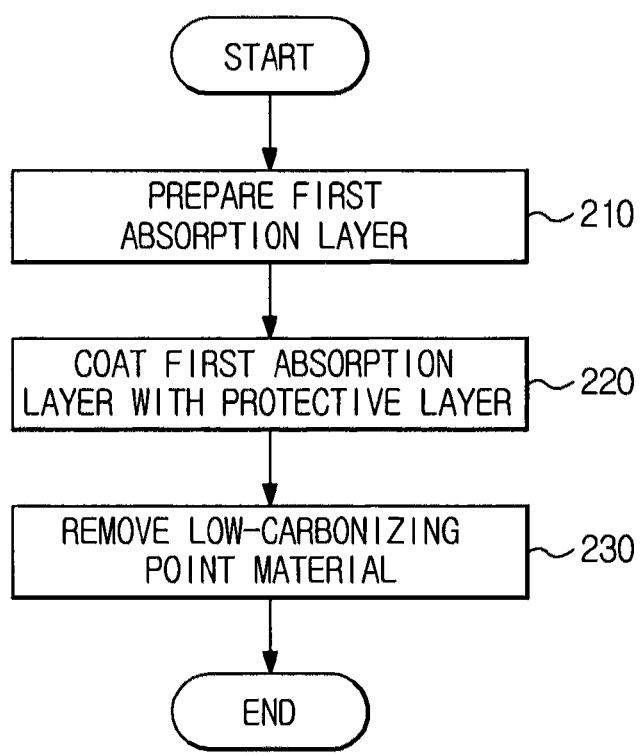
FIG. 5 is a flow chart illustrating a method of manufacturing the absorption cell of FIG. 3.
Figure 6:
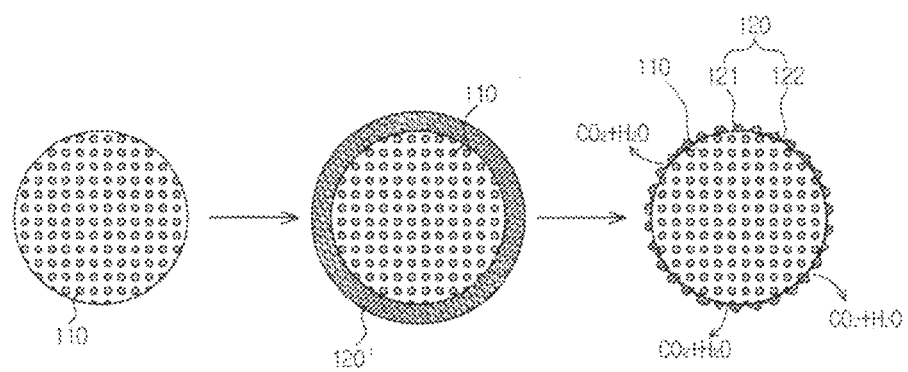
FIG. 6 is a view illustrating states of the absorption cell in respective operations of FIG. 5.

FIG. 5 is a flow chart illustrating a method of manufacturing the absorption cell of FIG. 3 and FIG. 6 is a view illustrating states of the absorption cell in respective operations of FIG. 5.

With reference to FIGS. 5 and 6, the first absorption layer 110 formed of a low-density absorbent is first prepared (Operation 210). The first absorption layer 110 may be designed in a spherical shape so as to form an inner core of the absorption cell 100, or be formed in other shapes.

After the first absorption layer 110 is prepared (Operation 210), the surface of the first absorption layer 110 is coated with a protective layer 120' so as to prevent generation of dust particles from the first absorption layer 110 (Operation 220).

The protective layer 120' is formed of a mixture of a low-carbonizing point material having a relatively low carbonizing point and a high-density absorbent having a higher density than the low-density absorbent.

The low-carbonizing point material is carbonized at a high temperature of more than 300° C. so that no carbon residue remains. As the low-carbonizing point material, a synthetic material, such as PolyPropylene (PP), PolyEthylene Terephthalate (PET) and Nylon, or a gaseous material, such as benzene, toluene and xylene, may be used.

The thickness of the protective layer 120' may be adjusted to various thicknesses values from several tens of nm to several hundred μm.

After the surface of the first absorption layer 110 is coated with the protective layer 120' (Operation 220), the low-carbonizing point material of the protective layer 120' is removed so as to form the second absorption layer 120 including the plural pore parts 122 (Operation 230).

In more detail, the low-carbonizing point material is removed through a carbonization process using heat or an acid-base process using an acid, such as hydrochloric acid or sulfuric acid.

When the carbonization process or the acid-base process is carried out, the low-carbonizing point material is converted into carbon dioxide ($CO_2$) and vapor ($H_2O$), and the converted carbon dioxide ($CO_2$) and vapor ($H_2O$) are discharged to air. Thereby, the pore parts 122 serving as channels to transfer external air to the first absorption layer 110 are formed.

Figure 7:
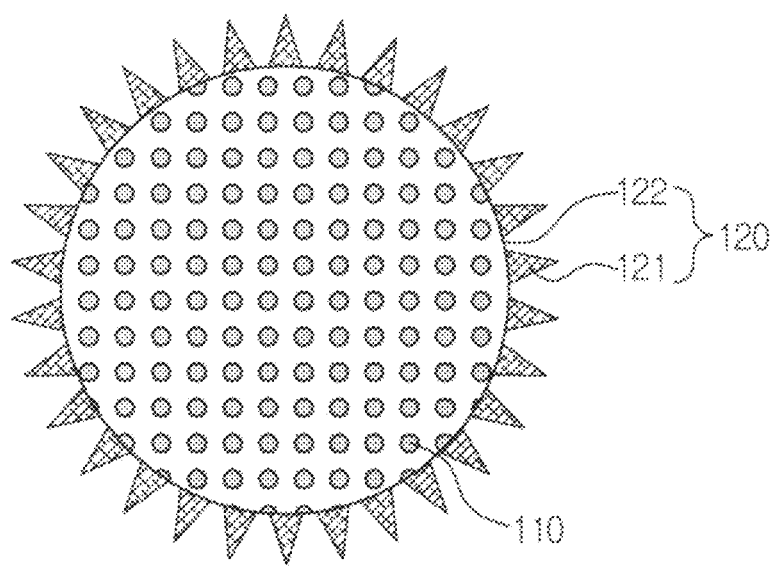
FIG. 7 is a view illustrating an absorption cell in accordance with another embodiment of the present disclosure.

FIG. 7 is a view illustrating an absorption cell in accordance with another embodiment of the present disclosure.

An absorption cell 100 in accordance with this embodiment includes a first absorption layer 110 and a second absorption layer 120.

The first absorption layer 110 is formed of an absorbent and serves as an inner core of the absorption cell 100. Although this embodiment illustrates the first absorption layer 110 as being formed in a spherical shape, the first absorption layer 110 may be formed in other shapes than the spherical shape.

Particularly, in this embodiment, in order to minimize increase in a contact surface area of the absorption cell 100 with air due to the second absorption layer 120, the second absorption layer 120 is formed in the shape of a plurality of protrusion parts having a designated thickness.

In more detail, with reference to FIG. 7, the second absorption layer 120 includes protrusion parts 121 and pore parts 122.

The protrusion parts 121, each of which has a sharpened tip, are separated by designated intervals.

The protrusion parts 121 are formed of a high-density absorbent, and have sufficient thickness and density to increase the contact surface area with external air.

Further, the pore parts 122 allowing the external air to flow to the first absorption layer 110 are provided between the protrusion parts 121.

Thereby, generation of minute dust particles from the first absorption layer 110 due to physical impact is prevented and thus secondary contamination is prevented, and the contact surface area of the absorption cell 100 with external air is increased and thus removal efficiency of the absorption cell 100 is raised.

Although this embodiment illustrates each of the protrusion parts 121 as having the sharpened tip, each of the protrusion parts 121 may have a curved tip or an irregular shape as long as it is protruded from the first absorption layer 110 to a designated thickness.

Further, although this embodiment illustrates the protrusion parts 121 and the pore parts 122 as being regularly arranged, the protrusion parts 121 and the pore parts 122 may be irregularly arranged.

That is, some parts of the second absorption layer 120 may be protruded to a designated thickness to protect the surface of the first absorption layer 110, and some parts of the second absorption layer 120 may be perforated to serve as channels to the first absorption layer 110.

Figure 8:
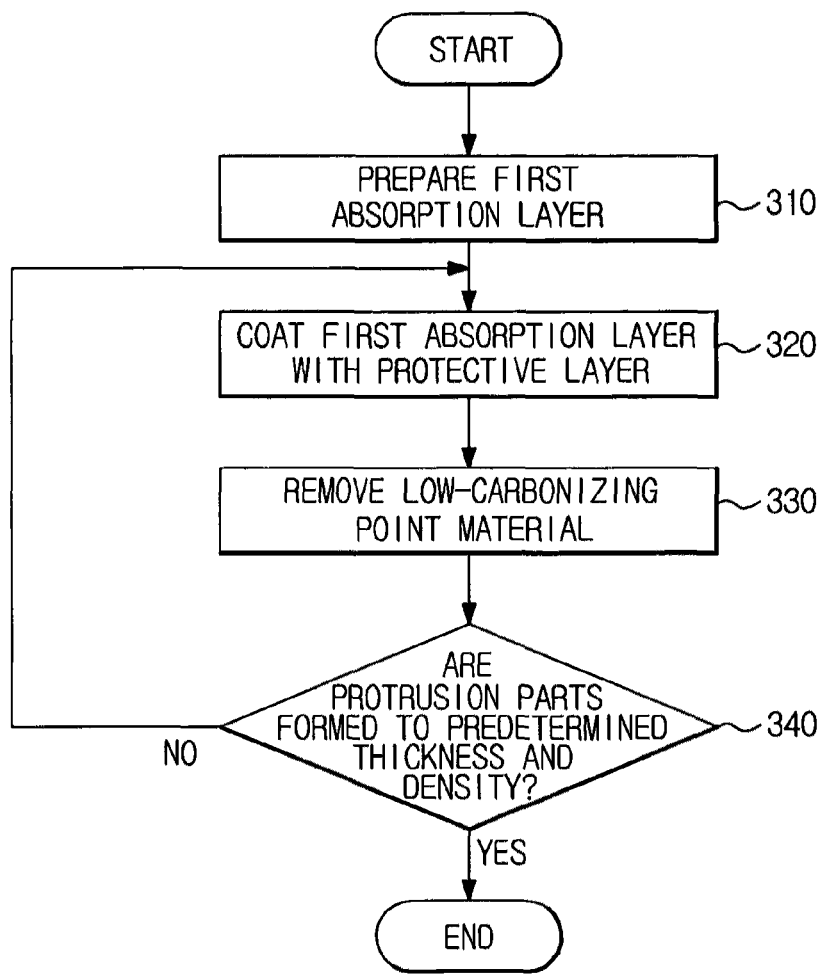
FIG. 8 is a flow chart illustrating a method of manufacturing the absorption cell of FIG. 7.
Figure 9:
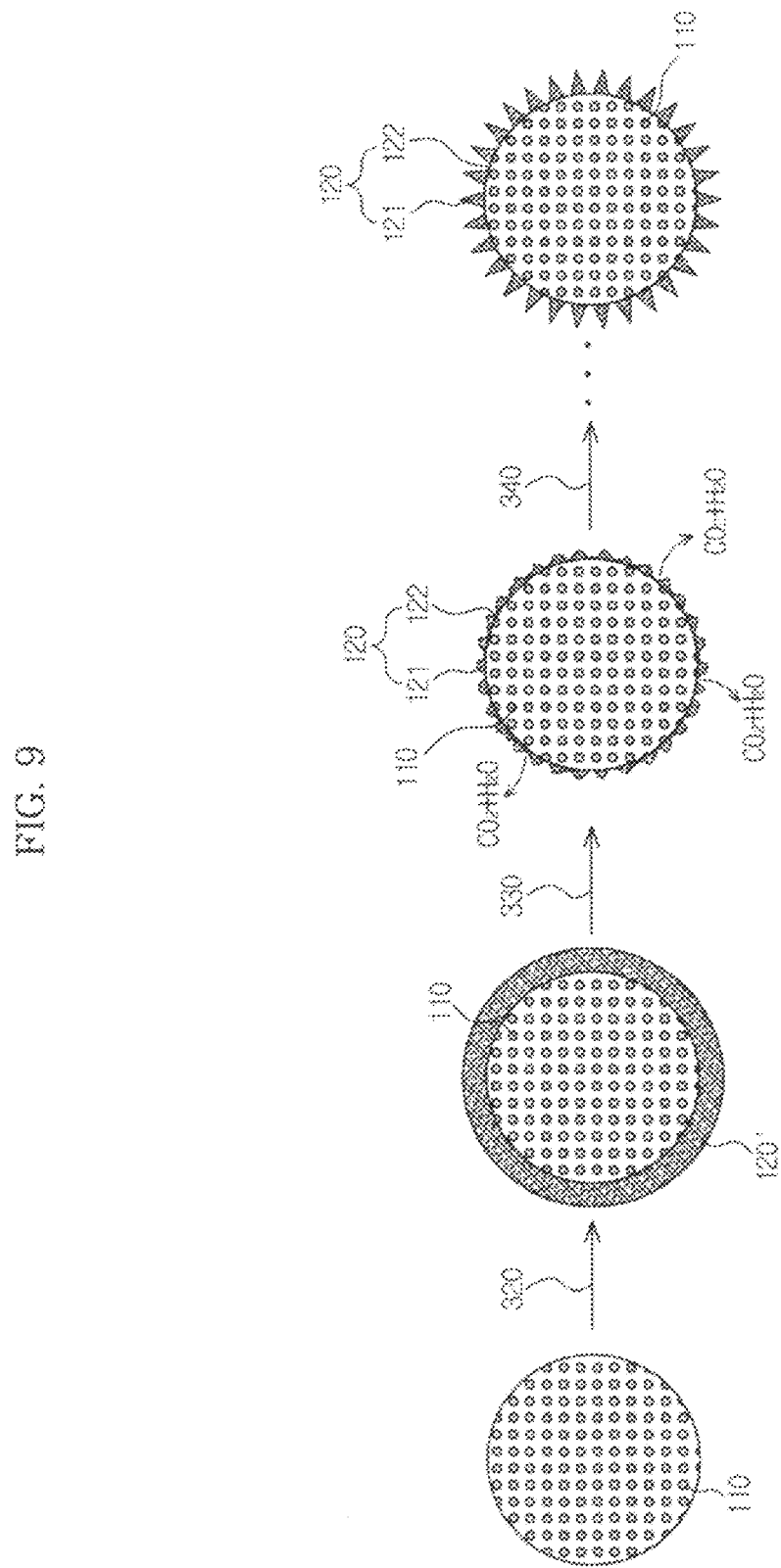
FIG. 9 is a view illustrating states of the absorption cell in respective operations of FIG. 8.

FIG. 8 is a flow chart illustrating a method of manufacturing the absorption cell of FIG. 7 and FIG. 9 is a view illustrating states of the absorption cell in respective operations of FIG. 8.

With reference to FIGS. 8 and 9, the first absorption layer 110 formed of an absorbent is first prepared (Operation 310), and the surface of the first absorption layer 110 is coated with a protective layer 120' (Operation 320).

The protective layer 120' is formed of a mixture of a low-carbonizing point material and a high-density absorbent having a higher density than the absorbent of the first absorption layer 110, and serves to protect the first absorption layer 110 from physical impact from external air.

Thereby, generation of minute dust particles from the first absorption layer 110 is prevented and thus secondary contamination is prevented.

After the surface of the first absorption layer 110 is coated with the protective layer 120' (Operation 320), the low-carbonizing point material through a carbonization process or an oxidation process is removed so as to form the second absorption layer 120 including the plural pore parts 122 serving as channels to the first absorption layer 110 (Operation 330).

Particularly, in this embodiment, in order to minimize increase in a contact surface area of the absorption cell 100 with external air due to the second absorption layer 120 including the pore parts 122, the thickness of the second absorption layer 120 is increased.

In more detail, in this embodiment, coating of the surface of the first absorption layer 110 with the protective layer 120' and removal of the low-carbonizing point material are repeated (Operation 340).

Here, coating of the surface of the first absorption layer 110 with the protective layer 120' and removal of the low-carbonizing point material are repeated until the protrusion parts 121 of the second absorption layer 120 are formed to designated thickness and density.

A rate of the high-density absorbent of the protective layer 120' is preferably set to 10~15% such that a rate of the low-carbonizing point material of the protective layer 120' is sufficiently higher than the rate of the high-density absorbent of the protective layer 120'.

This is done to prevent the channels to the first absorption layer 110 from being clogged due to repetition of coating of the surface of the first absorption layer 110 with the protective layer 120' and removal of the low-carbonizing point material (Operation 340).

Figure 10:
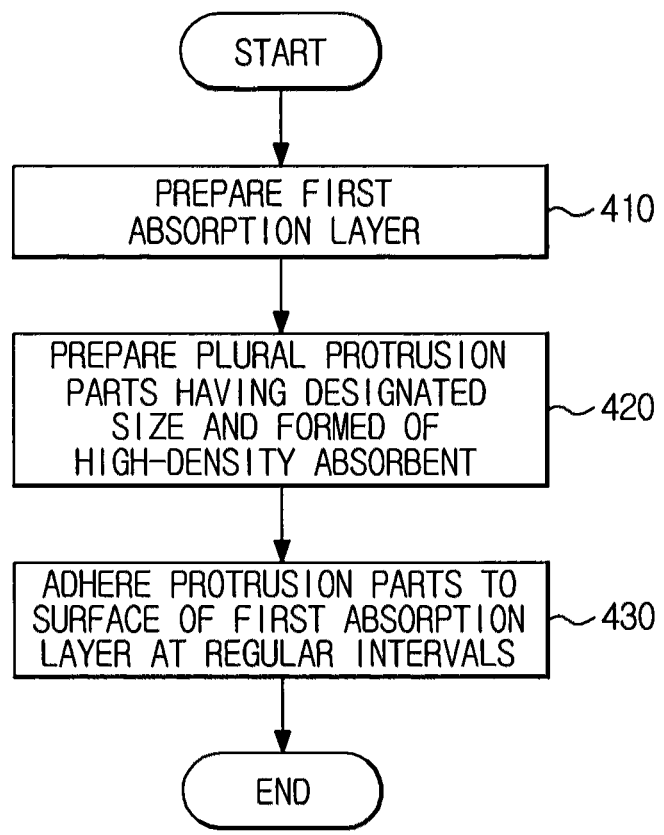
FIG. 10 is a flow chart illustrating another method of manufacturing the absorption cell of FIG. 7.

FIG. 10 is a flow chart illustrating another method of manufacturing the absorption cell of FIG. 7.

With reference to FIG. 10, the first absorption layer 110 formed of an absorbent is first prepared (Operation 410).

After the first absorption layer 110 is prepared (Operation 410), a plurality of protrusion parts having a regular size and formed of a high-density absorbent having a higher density than the absorbent of the first absorption layer 110 is prepared (Operation 420).

The protrusion parts are adhered to the surface of the first absorption layer 110 such that the protrusion parts are separated from each other at regular intervals (Operation 430).

Differently from the manufacturing method of FIGS. 8 and 9, the manufacturing method of FIG. 10 is advantageous in that the protrusion parts having regular thickness and shape are adhered to the first adhesion layer 110 at regular intervals.

Until now, the absorption cells and the manufacturing methods thereof to prevent generation of minute dust particles, to increase the surface area of the absorption cells contacting external air and to allow air to be introduced into the low-density absorbent have been described.

Since odor generating substances in air are rapidly removed by the first absorption layer having high removal rate, removal capacity of the first absorption layer needs to be increased.

For this purpose, an amount of the absorbent contained in the same volume needs to be increased. Hereinafter, in order to increase the removal capacity of the first absorption layer, absorption cells and manufacturing methods thereof in accordance with other embodiments of the present disclosure will be described with reference to FIGS. 11 and 12.

Figure 11:
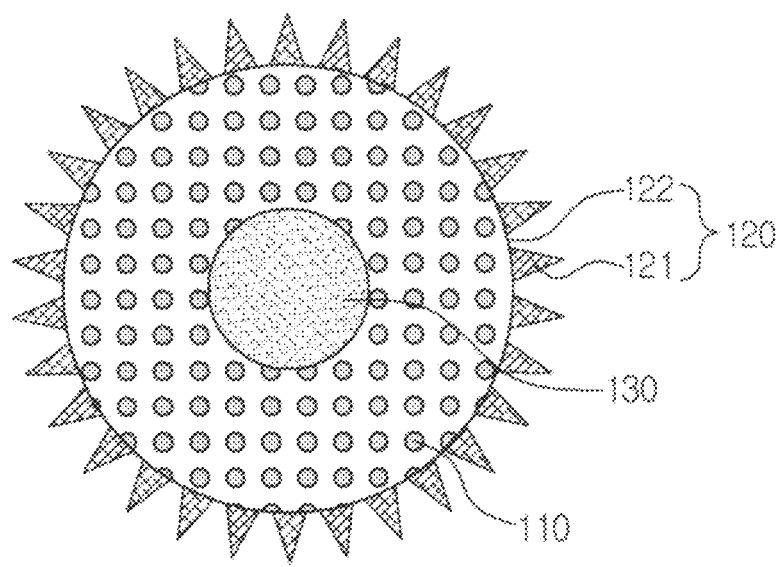
FIG. 11 is a view illustrating an absorption cell in accordance with another embodiment of the present disclosure.

FIG. 11 is a view illustrating an absorption cell in accordance with another embodiment of the present disclosure.

An absorption cell 100 in accordance with this embodiment includes a first absorption layer 110 and a second absorption layer 120 to protect the surface of the first absorption layer 110, and further includes a third absorption layer 130.

The third absorption layer 130 is formed of a high-density absorbent, and is provided within the first absorption layer 110.

With reference to FIG. 11, the third absorption layer 130 in accordance with this embodiment serves as an inner core of the first absorption layer 110 formed in a spherical shape.

By forming the third absorption layer 130 formed of the high-density absorbent within the first absorption layer 110 formed of a low-density absorbent, the removal capacity of the first absorption layer 110 may be increased. This is because an amount of absorbents contained in the absorption layer in the same volume is increased.

Other parts of the absorption cell in accordance with this embodiment are the same as those of the absorption cells in accordance with the former embodiments, and thus a detailed description thereof will be omitted.

Hereinafter, a manufacturing method of the absorption cell 100 in accordance with this embodiment will be described.

First, the third absorption layer 130 formed of a high-density absorbent and serving as a core is prepared.

The third absorption layer 130 is coated with the first absorption layer 110 formed of a low-density absorbent, and the surface of the first absorbent layer 110 is coated with the second absorption layer 120 formed of a high-density absorbent.

That is, the upper surface of the third absorption layer 130 is coated with the first absorption layer 110, and the upper surface of the first absorbent layer 110 is coated with the second absorption layer 120, thereby manufacturing three absorption layers formed of absorbents having different densities.

The second absorption layer 120 includes protrusion parts 121 made of the absorbent and pore parts 122 forming channels to the first absorption layer 110. In order to form the protrusion parts 121 and the pore parts 122, the upper surface of the first absorption layer 110 is coated with a protective layer formed of a mixture of a low-carbonizing point material and the high-density absorbent.

The low-carbonizing point material is removed from the protective layer by applying heat to the coated protective layer or through acid treatment.

Thereby, the second absorption layer 120 formed of the absorbent, some parts of which are protruded, and some parts of which are perforated, is formed.

Here, when coating of the surface of the first absorption layer 110 with the protective layer and removal of the low-carbonizing point material are repeated, size and density of the protrusion parts 121 of the second absorption layer 120 may be increased.

Further, in order to form the second absorption layer 120 including the protrusion parts 121 having increasing thickness and density, the plural protrusion parts 121 having regular shape and size and formed of the high-density absorbent may be first prepared and then be adhered to the surface of the first absorption layer 110 such that the protrusion parts 121 are separated from each other at regular intervals.

The absorption cell 100 including the protrusion parts 121 having increased size and density formed by the above process has a large contact surface area with air, thus having high odor generating substance removal efficiency.

Figure 12:
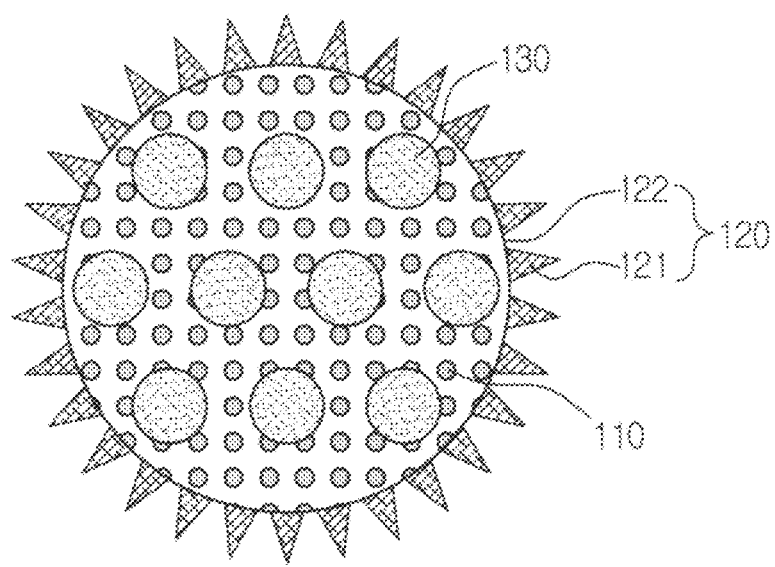
FIG. 12 is a view illustrating an absorption cell in accordance with another embodiment of the present disclosure.

FIG. 12 is a view illustrating an absorption cell in accordance with another embodiment of the present disclosure.

An absorption cell 100 in accordance with this embodiment includes a first absorption layer 110 and a second absorption layer 120 formed of a high-density absorbent to protect the surface of the first absorption layer 110.

Particularly, the first absorption layer 110 in accordance with this embodiment is formed of a mixture of a low-density absorbent and a high-density absorbent 130.

Thereby, an amount of absorbents contained in the same volume is increased, and thus a removal capacity of the absorption cell 100 is increased.

A structure of the second absorption layer 120 in accordance with this embodiment is the same as that of the second absorption layers in accordance with the former embodiments, and thus a detailed description thereof will be omitted.

Hereinafter, a manufacturing method of the absorption cell 100 in accordance with this embodiment will be described.

First, the first absorption layer 110 formed of the mixture of the low-density absorbent and the high-density absorbent 130 is prepared, and the upper surface of the first absorption layer 110 is coated with the second absorption layer 120.

The second absorption layer 120 includes a plurality of pore parts 122, described above, to form air channels to the first absorption layer 110. A manufacturing method of the second absorption layer 120 in accordance with this embodiment is the same as the manufacturing method of the second absorption layer 120 in accordance with the embodiment shown in FIG. 11, and thus a detailed description thereof will be omitted.

Until now, the absorption cells and the manufacturing methods thereof in accordance with various embodiments of the present disclosure have been described.

As is apparent from the above description, in an absorption cell and a manufacturing method thereof in accordance with one embodiment of the present disclosure, the upper surface of an absorption layer formed of a low-density absorbent is coated with a high-density absorption layer formed of a high-density absorbent, thereby preventing generation of minute dust particles from the absorption layer and thus preventing secondary contamination.

Further, pore parts are formed in the high-density absorption layer and serve to air channels to the absorption layer, thereby increasing odor generating substance removal rate of the absorption cell.

Further, protrusion parts obtained by forming the pore parts in the high-density absorption layer increase a contact surface area of the high-density absorption layer with air and contact time between the absorption cell and the air, increasing removal efficiency.

Further, another high-density absorption layer is further formed within the low-density absorption layer or the absorption layer is formed of a mixture of a high-density absorbent and a low-density absorbent, thereby increasing removal capacity of the absorption cell.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An absorption cell comprising:
    an absorption portion formed of an absorbent material; and
    a protective layer formed by a process of coating a mixture of two or more materials on the absorption portion and a process of forming a plurality pore parts in the protective layer by removing one of the two or more materials,
    wherein the absorbent material includes a first absorbent, the mixture of two or more materials includes a second absorbent having a higher density than the first absorbent, the second absorbent not being removed from the mixture of two or more materials, and
    the protective layer is an outermost layer of the absorption cell, the protective layer being coated on an outer surface of the absorption portion so as to prevent particles from breaking off from the absorption portion.

2. The absorption cell according to claim 1, wherein the protective layer further includes a plurality of protrusion parts protruded from the absorption portion.

3. The absorption cell according to claim 1, wherein the absorption portion is formed in a spherical shape.

4. The absorption cell according to claim 1, wherein the absorption portion further comprises an absorption core section formed of a material which is the same as one of the materials of the protective layer.

5. The absorption cell according to claim 4, wherein the absorption portion is formed in a spherical shape.

6. The absorption cell according to claim 4, wherein the protective layer further includes a plurality of protrusion parts protruded from the absorption portion.

7. An absorption cell comprising:
    a absorption portion formed of a first mixture of two materials; and a protective layer formed by a process of coating a second mixture of two or more materials on the absorption portion and a process of forming a plurality pore parts in the protective layer by removing one of the two or more materials, wherein the first mixture includes a first absorbent, the second mixture of two or more materials includes a second absorbent having a higher density than the first absorbent, the second absorbent not being removed from the mixture of two or more materials, and the protective layer is an outermost layer of the absorption cell, the protective layer being coated on an outer surface of the absorption portion so as to prevent particles from breaking off from the absorption portion.

8. The absorption cell according to claim 7, wherein the protective layer further includes a plurality of protrusion parts protruded from the absorption portion.

9. The absorption cell according to claim 7, wherein the absorption portion is formed in a spherical shape.

\* \* \* \* \*